Aug. 14, 1923.
M. D. TAYLOR
HYDRAULIC SHOCK ABSORBER
Filed Nov. 3, 1921
1,464,686
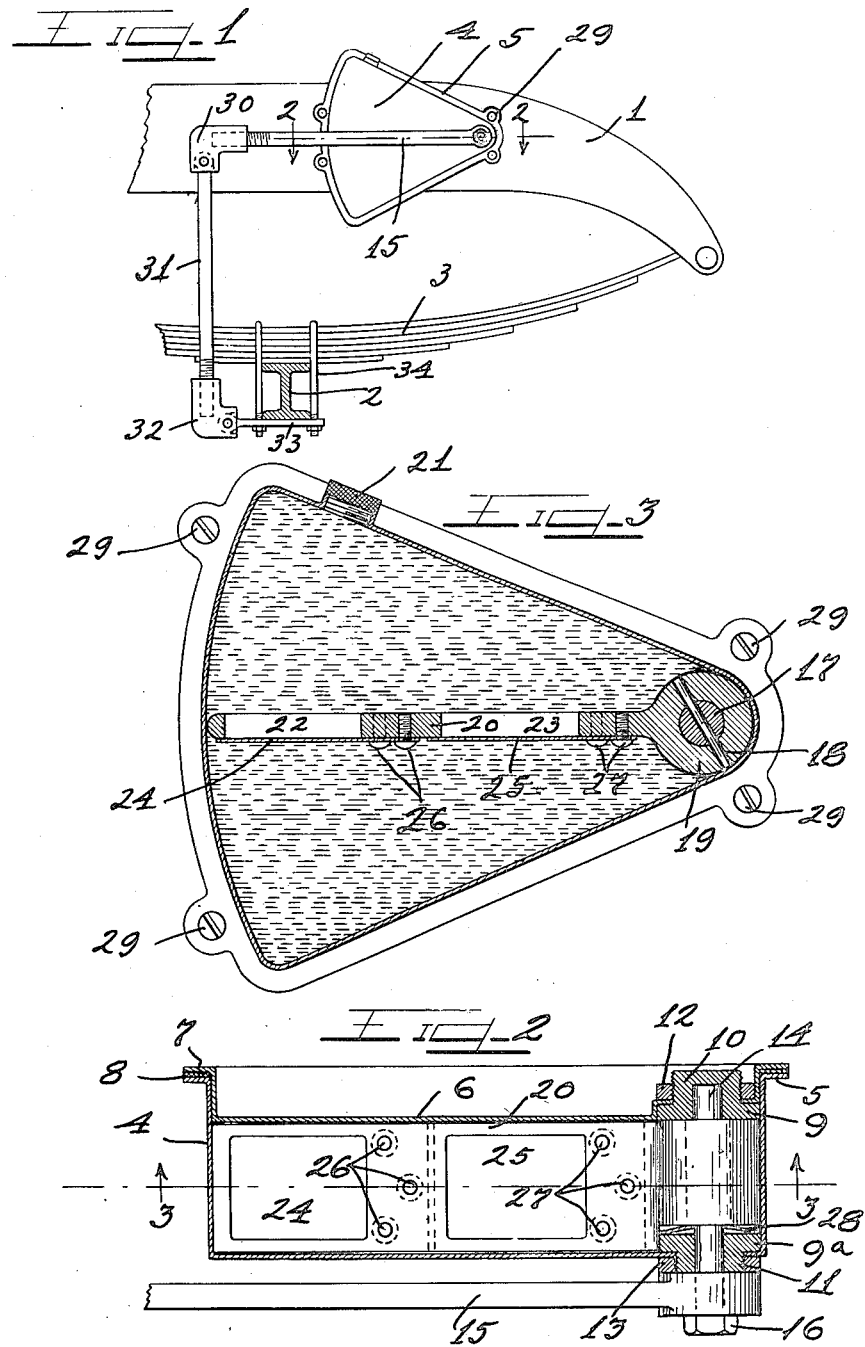

Patented Aug. 14, 1923.

1,464,686

UNITED STATES PATENT OFFICE.

MURLIN D. TAYLOR, OF CHICAGO, ILLINOIS.

HYDRAULIC SHOCK ABSORBER.

Application filed November 3, 1921. Serial No. 512,425.

*To all whom it may concern:*

Be it known that I, MURLIN D. TAYLOR, a citizen of the United States, and a resident of the city of Chicago, in the county of Cook and State of Illinois, have invented certain new and useful Improvements in a Hydraulic Shock Absorber; and I do hereby declare that the following is a full, clear, and exact description of the same, reference being had to the accompanying drawings, and to the numerals of reference marked thereon, which form a part of this specification.

This invention relates to hydraulic shock absorbers and particularly to a device which is adapted to be installed between a vehicle body and the running gear thereof to modify the action of the vehicle spring and to prevent the transmission of shocks received by the running gear to the vehicle body.

It is an object of this invention to provide a hydraulic shock absorber wherein a fluid retarded means is permitted to move through the fluid in one direction with less restriction than in the other direction.

It is also an object of this invention to provide a hydraulic shock absorber having a valve retarding means permitting relatively free movement of the vehicle body and running gear in one direction and retarding the relative movement thereof in the other direction.

It is a further object of this invention to provide a shock absorber having an improved toggle connection between the vehicle body and running gear.

It is an important object of this invention to provide an efficient hydraulic shock absorber which may be easily installed and economically manufactured.

Other and further important objects of this invention will be apparent from the disclosures in the specification and the accompanying drawings.

The invention (in a preferred form) is illustrated in the drawings and hereinafter more fully described.

On the drawings:

Figure 1 is a fragmentary side elevation, with parts in section, of a shock absorber installation embodying the principles of this invention.

Figure 2 is an enlarged fragmentary section on the line 2—2 of Figure 1 with parts in elevation.

Figure 3 is a section on the line 3—3 of Figure 2.

As shown on the drawings:

The shock absorber installation of this invention is adapted to be connected between a vehicle chassis 1 and the vehicle axle 2 or any other suitable portion of the vehicle running gear to act as an auxiliary to the ordinary vehicle spring 3 in cushioning the shocks received by the vehicle running gear and preventing the transmission thereof to the vehicle body which is mounted on the chassis 1.

In the embodiment of the invention which is illustrated herein the shock absorber is particularly designed to check the rebound which is caused by the flexing of the vehicle spring 3 due to shocks received by the vehicle running gear, but it is of course evident that the installation might also be conveniently used as an auxiliary to the vehicle spring 3 for directly cushioning shocks which would not be sufficient to flex the vehicle spring 3.

The shock absorbing installation comprises a segment shaped fluid containing casing which consists of a container member or portion 4 which is provided with an integral flange 5 and the inner side of which is closed by a member or portion 6 which is shaped similarly to the portion 4 and which is provided with a flange 7 setting on the flange 5, a suitable packing 8 ordinarily being interposed between said flanges.

Mounted in the narrow end of the casing 3 are bearings 9 and 9ª which are provided with threaded portions 10 and 11 which respectively extend outwardly through apertures in the members 6 and 4 and which have nuts 12 and 13 engaged thereon and abutting the outside of said portions 6 and 4. Mounted in said bearing portions 9 and 9ª is a shaft 14, one end of which extends outwardly through the threaded portion 11 and has a lever 15 keyed thereon and secured in position by a nut 16 on the outer end of said shaft.

Pinned to an enlarged portion 17 of the shaft 14 by means of a pin 18 is a cylindrical hub 19 which is provided with a vane 20 which extends outwardly therefrom into the container which is afforded by the members 4 and 6 and is movable in a fluid such as oil or other suitable liquid which is introduced into the container through an opening therein which is normally closed by a plug 21. The vane 20 is of such dimensions that only a relatively small space is allowed for passage of liquid between the edges of the same and the walls of the container, and in order that a relatively free movement of the vane in the fluid may be allowed in one direction, apertures 22 and 23 are provided therein and are covered by flap valves 24 and 25 which are secured to said vane by means of screws 26 and 27. Said flap valves 24 and 25 are constructed of resilient material so that when the vane moves through the liquid in an upward direction they will be sprung downwardly and the liquid will be permitted to flow through the apertures 22 and 23, while when the vane moves through the liquid in a downward direction said valves will be closed over the apertures and the liquid only permitted to flow between the outer edges of the vane and the walls of the container. In order that the vane may be resiliently maintained in position in the casing and in order that the leakage of liquid past the bearing portion 9ª may be permitted, a spring packing washer 28 is interposed between the inner end of the bearing portion 9ª and the end of the hub portion 19. The container is secured to the vehicle chassis 1 by means of screws or bolts 29 which are engaged through registering apertures in the flanges 5 and 7, said bolts or screws also acting to secure the flanges together. Adjustably secured to the outer end of the lever 15 is an elbow 30 which has pivotally connected thereto a link 31 which extends downwardly past the vehicle spring 3 and is in turn adjustably connected to an elbow 32 which is pivoted to a plate 33 secured to the spring clips 34 on the under side of the vehicle axle 2. Thus a toggle connection is afforded between the outer end of the lever 15 and the vehicle running gear, and the relative motion of the vehicle running gear and the chassis or vehicle body is transmitted to the vane 20 and this relative movement consequently retarded by said vane in one direction.

The adjustable connections between the elbow 30 and the lever 15, and the link 31 and the elbow 32, afford means whereby the installation may be properly adjusted to the particular vehicle on which it is mounted, and in the installation of the same it is only necessary to secure the fluid container in position by means of the bolts or screws 29 and to secure the plate 33 in position on the spring clips 34, no substantial alteration of the vehicle being required.

By employing oil as a retarding fluid in the container it is possible to automatically lubricate the moving parts thereof and there is consequently little wear and the device is long-lived.

It is of course understood that the apertures 22 and 23 may be made in various shapes and sizes and that the space left between the edges of the vane 20 and the walls of the container may be varied to effect any desired retardation.

On account of the few parts embodied in the construction of the shock absorber of this invention it may be economically manufactured, and because of the ease with which it may be installed and its desirable motion retarding qualities it is particularly desirable for use on commercial motor vehicles.

I am aware that numerous details of construction may be varied through a wide range without departing from the principles of this invention, and I therefore do not purpose limiting the patent granted otherwise than necessitated by the prior art.

I claim as my invention:

A shock absorber comprising a segment shaped, fluid tight casing having apertures in its restricted end, flanged bearings extending through said apertures with the flanges thereof resting against the inner surface of the casing, means for binding said bearings to said casing with a water tight fit, a shaft rotatably supported in said bearing and extending through one of them, a vane secured upon said shaft within said casing and a lever secured to said shaft beyond said casing for the purpose described.

In testimony whereof I have hereunto subscribed my name in the presence of two subscribing witnesses.

MURLIN D. TAYLOR.

Witnesses:
CARLTON HILL,
JAMES M. O'BRIEN.